(12) United States Patent
Kume et al.

(10) Patent No.: US 10,907,624 B2
(45) Date of Patent: Feb. 2, 2021

(54) VARIABLE-CAPACITY COMPRESSOR CONTROL VALVE

(71) Applicant: Fujikoki Corporation, Tokyo (JP)

(72) Inventors: Yoshiyuki Kume, Tokyo (JP); Hisashi Asano, Tokyo (JP); Takashi Sakamoto, Tokyo (JP); Masaharu Itoh, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 16/327,623

(22) PCT Filed: Jul. 5, 2017

(86) PCT No.: PCT/JP2017/024580
§ 371 (c)(1),
(2) Date: Feb. 22, 2019

(87) PCT Pub. No.: WO2018/061380
PCT Pub. Date: Apr. 5, 2018

(65) Prior Publication Data
US 2019/0226467 A1    Jul. 25, 2019

(30) Foreign Application Priority Data

Sep. 30, 2016 (JP) ................. 2016-192950

(51) Int. Cl.
*F16K 31/02* (2006.01)
*F04B 27/18* (2006.01)
(Continued)

(52) U.S. Cl.
CPC .............. *F04B 27/18* (2013.01); *F04B 49/12* (2013.01); *F16K 11/14* (2013.01); *F16K 31/06* (2013.01);
(Continued)

(58) Field of Classification Search
CPC .......... F04B 27/18; F04B 49/12; F16K 11/14; F16K 31/06; F16K 31/0613; F16K 31/0624; F16K 31/365; G05D 16/2013
(Continued)

(56) References Cited

U.S. PATENT DOCUMENTS

2001/0003573 A1    6/2001   Kimura et al.
2004/0202552 A1*  10/2004   Okii ................... F04B 27/1804
                                                                    417/222.2
(Continued)

FOREIGN PATENT DOCUMENTS

EP    1081378 A2    3/2001
JP    07-32270 A    6/1995
(Continued)

OTHER PUBLICATIONS

U.S. Appl. No. 16/306,438, filed Nov. 30, 2018, Variable-Capacity Compressor Control Valve.
(Continued)

*Primary Examiner* — Minh Q Le
(74) *Attorney, Agent, or Firm* — Lucas & Mercanti, LLP

(57) ABSTRACT

Provided is a variable-capacity compressor control valve that is compact and is capable of suppressing the influence of the pressure difference between the crank chamber pressure Pc, the suction pressure Ps, and the like. A valve body includes an in-valve release passage for releasing a pressure Pc in a crank chamber to a suction chamber of a compressor via a Ps inlet/outlet port. A sub valve element adapted to open or close the in-valve release passage along with movement of the plunger is provided.

11 Claims, 13 Drawing Sheets

(51) Int. Cl.
    *F04B 49/12*     (2006.01)
    *F16K 31/06*     (2006.01)
    *F16K 11/14*     (2006.01)
    *G05D 16/20*     (2006.01)
    *F16K 31/365*    (2006.01)

(52) U.S. Cl.
    CPC ...... *F16K 31/0613* (2013.01); *F16K 31/0624* (2013.01); *F16K 31/365* (2013.01); *G05D 16/2013* (2013.01)

(58) Field of Classification Search
    USPC ............... 137/487.5; 417/222.2; 251/129.02, 251/129.15, 129.18, 61.5
    See application file for complete search history.

(56) References Cited

U.S. PATENT DOCUMENTS

| | | | | |
|---|---|---|---|---|
| 2005/0035321 A1* | 2/2005 | Uemura | ............. | F04B 27/1804 251/129.03 |
| 2005/0040356 A1* | 2/2005 | Uemura | ............. | F04B 27/1804 251/129.15 |
| 2005/0067598 A1* | 3/2005 | Okii | .................... | F04B 27/1804 251/129.15 |
| 2005/0218364 A1 | 10/2005 | Ohi et al. | | |
| 2007/0145315 A1* | 6/2007 | Uemura | ............. | F04B 27/1804 251/84 |
| 2009/0032750 A1* | 2/2009 | Morisawa | ........... | F04B 27/1804 251/129.01 |
| 2009/0283164 A1* | 11/2009 | Cho | .................... | F04B 27/1804 137/624.27 |
| 2011/0182753 A1* | 7/2011 | Taguchi | ............. | F04B 27/1804 417/222.1 |
| 2011/0219797 A1* | 9/2011 | Taguchi | ............... | B60H 1/3208 62/129 |
| 2012/0056113 A1 | 3/2012 | Tano et al. | | |
| 2012/0198992 A1* | 8/2012 | Futakuchi | ........... | F04B 27/1804 91/505 |
| 2012/0198993 A1* | 8/2012 | Fukudome | .......... | F04B 27/1804 91/505 |
| 2012/0251343 A1* | 10/2012 | Taguchi | ............. | F04B 27/1804 417/222.2 |
| 2013/0291963 A1* | 11/2013 | Futakuchi | .......... | B60H 1/00485 137/487.5 |
| 2015/0068628 A1* | 3/2015 | Iwa | ..................... | F16K 11/0716 137/625.65 |
| 2015/0211506 A1* | 7/2015 | Shirafuji | ............. | F04B 27/1804 417/222.2 |
| 2015/0345655 A1* | 12/2015 | Higashidozono | ... | F16K 31/0624 137/624.27 |
| 2018/0291888 A1* | 10/2018 | Tonegawa | ............ | F04B 49/22 |
| 2019/0154168 A1* | 5/2019 | Kume | ..................... | F04B 49/12 |
| 2019/0162175 A1* | 5/2019 | Higashidozono | ....... | F04B 27/18 |

FOREIGN PATENT DOCUMENTS

| | | |
|---|---|---|
| JP | 2001-165055 A | 6/2001 |
| JP | 2006-242321 A | 9/2006 |
| JP | 2010-185285 A | 8/2010 |
| JP | 2012-211579 A | 11/2012 |
| JP | 2012-246914 A | 12/2012 |
| JP | 2013-130126 A | 7/2013 |
| KR | 101249253 B1 | 4/2013 |

OTHER PUBLICATIONS

U.S. Appl. No. 16/306,455, filed Nov. 30, 2018, Variable-Capacity Compressor Control Valve and Method for Assembling the Same.
U.S. Appl. No. 16/306,445, filed Nov. 30, 2018, Variable-Capacity Compressor Control Valve.
U.S. Appl. No. 16/306,447, filed Nov. 30, 2018, Variable-Capacity Compressor Control Valve.
U.S. Appl. No. 16/309,036, filed Dec. 11, 2018, Variable-Capacity Compressor Control Valve.
European Patent Office, Extended European Search Report dated Mar. 13, 2020, which was issued in a related European application No. 17855339.2 (7 pages).

* cited by examiner

Normal Control Time
[Main Valve Element (Pd-Pc): Open,
Sub Valve Element (Pc-Ps): Closed]

Compressor Actuation Time
[Main Valve Element (Pd-Pc): Closed,
Sub Valve Element (Pc-Ps): Open]

A-A Cross-Section

U-U Cross-Section

V-V Cross-Section

[Compressor Actuation Time]

VARIABLE-CAPACITY COMPRESSOR CONTROL VALVE

CROSS-REFERENCE TO RELATED APPLICATIONS

This application is a 371 of PCT/JP2017/024580, filed Jul. 5, 2017, which claims benefit of Japanese Patent Application No. 2016-192950 filed on Sep. 30, 2016.

TECHNICAL FIELD

The present invention relates to a variable-capacity compressor control valve for use in an automotive air conditioner or the like. In particular, the present invention relates to a variable-capacity compressor control valve capable of rapidly increasing discharge capacity during actuation of a compressor without decreasing the operation efficiency of the compressor.

BACKGROUND ART

Conventionally, a variable-capacity swash plate compressor such as the one schematically shown in FIGS. 10A and 10B has been used as a compressor for an automotive air conditioner. The variable-capacity swash plate compressor 100 includes a rotating shaft 101 that is rotationally driven by an on-vehicle engine, a swash plate 102 that is attached to the rotating shaft 101, a crank chamber 104 in which the swash plate 102 is disposed, a piston 105 that is reciprocated by the swash plate 102, a discharge chamber 106 for discharging refrigerant compressed by the piston 105, a suction chamber 107 for sucking refrigerant, an in-compressor release passage (i.e., a fixed orifice) 108 for releasing the pressure Pc in the crank chamber 104 to the suction chamber 107, and the like.

Meanwhile, a control valve 1' used for the aforementioned variable-capacity compressor receives the discharge pressure Pd from the discharge chamber 106 of the compressor 100 and is configured to control the pressure Pc in the crank chamber 104 by controlling the discharge pressure Pd in accordance with the suction pressure Ps of the compressor 100. Such a control valve 1' has, as the basic configuration, a valve body that includes a valve chamber with a valve orifice, a Ps inlet/outlet port communicating with a suction chamber 107 of the compressor 100, a Pd introduction port arranged upstream of the valve orifice and communicating with a discharge chamber 106 of the compressor 100, and a Pc inlet/outlet port arranged downstream of the valve orifice and communicating with a crank chamber 104 of the compressor 100; a main valve element for opening or closing the valve orifice; an electromagnetic actuator with a plunger for moving the main valve element in the direction to open or close the valve orifice; a pressure-sensitive chamber that receives the suction pressure Ps from the compressor 100 via the Ps inlet/outlet port; and a pressure-sensitive reaction member that urges the main valve element in the direction to open or close the valve orifice in accordance with the pressure in the pressure-sensitive chamber. Further, the in-valve release passage 16' for releasing the pressure Pc in the crank chamber 104 to the suction chamber 107 of the compressor 100 via the Ps inlet/outlet port is provided in the main valve element, and the sub valve element for opening or closing the in-valve release passage 16' is also provided so that when the plunger is continuously moved upward from the lowest position by the attraction force of the electromagnetic actuator, the sub valve element moves upward together with the plunger while closing the in-valve release passage 16', and the main valve element is also moved upward so as to follow the sub valve element. Then, after the valve orifice is closed by the main valve element, if the plunger is moved further upward, the sub valve element is configured to open the in-valve release passage 16'. The main valve element and the valve orifice form a main valve unit indicated by reference numeral 11' in FIGS. 10A and 10B, while the sub valve element and the in-valve release passage form a sub valve unit indicated by reference numeral 12' (for example, see Patent Literature 1 below).

During the normal control time (i.e., Pd→Pc control time) of the control valve 1' with such a configuration, when current is flowed through a solenoid portion including a coil, a stator, an attractor, and the like of the electromagnetic actuator, the plunger is attracted by the attractor, and along with this, the sub valve element moves upward integrally with the plunger, and following the movement of the sub valve element, the main valve element is moved in the direction to close the valve by the urging force of a valve-closing spring. Meanwhile, the suction pressure Ps introduced from the compressor 100 via the Ps inlet/outlet port is introduced into the pressure-sensitive chamber through an inlet/outlet chamber via a horizontal hole in the plunger or the like, and the pressure-sensitive reaction member (e.g., a bellows device) is expansively or contractively displaced in accordance with the pressure (i.e., the suction pressure Ps) in the pressure-sensitive chamber (i.e., contracts if the suction pressure Ps is high, and expands if it is low), and the displacement (i.e., urging force) is then transmitted to the main valve element, whereby the main valve element portion of the main valve element moves up or down with respect to the valve orifice to regulate the valve opening of the main valve unit 11'. That is, the valve opening is determined by the force of attracting the plunger with the solenoid portion, urging force (i.e., expansion or contraction force) that acts with the expansive or contractive displacement of the pressure-sensitive reaction member, the urging force of a plunger spring (i.e., a valve-opening spring) and the valve-closing spring, and force that acts on the main valve element in the valve opening direction and in the valve closing direction. The pressure Pc in the crank chamber 104 (hereinafter also referred to as "crank chamber pressure Pc" or simply referred to as "pressure Pc") is controlled in accordance with the valve opening. In such a case, the main valve element is always urged upward by the urging force of the valve-closing spring, while the sub valve element is always urged downward by the urging force of the valve-opening spring. Thus, the sub valve unit 12' is closed and the in-valve release passage 16' is blocked in the main valve element. Therefore, there is no possibility that the crank chamber pressure Pc may be released to the suction chamber 107 via the in-valve release passage 16'.

In contrast, during the compressor actuation time, current is flowed through the solenoid portion so that the plunger is attracted by the attractor and the sub valve element moves upward together with the plunger. Following the upward movement of the sub valve element, the main valve element is moved in the direction to close the valve by the urging force of the valve-closing spring, and after the valve orifice is closed by the main valve element portion of the main valve element, the plunger is moved further upward, whereby the sub valve element opens the in-valve release passage 16'.

As describe above, in the aforementioned conventional control valve 1', since the crank chamber pressure Pc is released to the suction chamber 107 via two passages that are the in-compressor release passage 108 and the in-valve release passage 16' during the compressor actuation time, the time required to increase the discharge capacity can be shortened. Further, since the in-valve release passage 16' is closed by the sub valve element during the normal control time (i.e., Pd→Pc control time), there is no possibility that the operation efficiency of the compressor 100 will decrease.

CITATION LIST

Patent Literature

Patent Literature 1: JP 2013-130126 A

SUMMARY OF INVENTION

Technical Problem

By the way, in the aforementioned variable-capacity compressor control valve 1', the in-valve release passage 16' for releasing the pressure Pc in the crank chamber 104 to the suction chamber 107 of the compressor 100 is provided in the main valve element. Therefore, if the diameter of the in-valve release passage 16' (that is, the inside diameter of the main valve element) is increased to improve the actuation property, the outside diameter of the main valve element increases correspondingly. Consequently, the frame size of the control valve 1' becomes large, and there is also a possibility that the main valve element is likely to be susceptible to the influence of the pressure difference between the crank chamber pressure Pc, the suction pressure Ps, and the like that act on the main valve element (i.e., on the upper side and the lower side thereof).

The present invention has been made in view of the foregoing, and it is an object of the present invention to provide a variable-capacity compressor control valve that is compact and is capable of suppressing the influence of the pressure difference between the crank chamber pressure Pc, the suction pressure Ps, and the like.

Solution to Problem

In order to achieve the aforementioned object, a variable-capacity compressor control valve in accordance with the present invention basically includes a valve body including a valve chamber with a valve orifice, a Ps inlet/outlet port communicating with a suction chamber of a compressor, a Pd introduction port arranged upstream of the valve orifice and communicating with a discharge chamber of the compressor, and a Pc inlet/outlet port arranged downstream of the valve orifice and communicating with a crank chamber of the compressor; a main valve element adapted to open or close the valve orifice; an electromagnetic actuator including a plunger, the electromagnetic actuator being adapted to move the main valve element in a direction to open or close the valve orifice; a pressure-sensitive chamber adapted to receive a suction pressure Ps from the compressor via the Ps inlet/outlet port; and a pressure-sensitive reaction member adapted to urge the main valve element in the direction to open or close the valve orifice in accordance with a pressure in the pressure-sensitive chamber, in which the valve body includes an in-valve release passage for releasing a pressure Pc in the crank chamber to the suction chamber of the compressor via the Ps inlet/outlet port, and a sub valve element adapted to open or close the in-valve release passage along with a movement of the plunger is provided.

In a preferred aspect, when the plunger is continuously moved upward from the lowest position by an attraction force of the electromagnetic actuator, the main valve element is moved upward together with the plunger while the sub valve element closes the in-valve release passage, and when the plunger is moved further upward after valve orifice is closed by the main valve element, the sub valve element is moved upward together with the plunger while the main valve element closes the valve orifice so that the in-valve release passage is opened.

In further another preferred aspect, the in-valve release passage includes a communication passage in the valve body, the communication passage being adapted to allow a Pc inlet/outlet chamber continuous with the Pc inlet/outlet port and a Ps inlet/outlet chamber continuous with the Ps inlet/outlet port in the valve body to communicate with each other.

In still another preferred aspect, the valve body includes a tubular body member and a seat member securely inserted in the body member, the Pc inlet/outlet chamber is formed in the body member on one end side of the seat member, the Ps inlet/outlet chamber is formed in the body member on the other end side of the seat member, and the communication passage in the valve body is arranged between the body member and the seat member.

In further another preferred aspect, the communication passage in the valve body includes a vertical groove formed on one of the inner periphery of the body member or the outer periphery of the seat member.

In still another preferred aspect, the sub valve element is movably disposed in the Ps inlet/outlet chamber.

In further another preferred aspect, the seat member has a protrusion that protrudes toward the Ps inlet/outlet chamber, and the sub valve element is slidably disposed on the outer periphery of the protrusion.

In still another preferred aspect, the sub valve element includes a tubular portion and a flanged latch portion, the tubular portion being adapted to be slidably disposed around the protrusion and moved into contact with or away from an end edge portion of the communication passage in the valve body, and the flanged latch portion being adapted to be latched to the plunger so as to be moved together with the plunger.

In further another preferred aspect, the flanged latch portion is provided at one end of the tubular portion on a side opposite to the other end that is adapted to be moved into contact with or away from the end edge portion of the communication passage in the valve body.

In still another preferred aspect, the flanged latch portion is provided inwardly at the one end of the tubular portion.

In further another preferred aspect, the protrusion is a stopper portion adapted to define the lowest position of the plunger.

In still another preferred aspect, the plunger includes an outer flanged latch portion adapted to be opposite and in contact with the stopper portion and adapted to allow the flanged latch portion of the sub valve element to be latched thereto.

In further another preferred aspect, the flanged latch portion of the sub valve element and the outer flanged latch portion of the plunger are adapted to engage each other when the sub valve element is moved horizontally with respect to the plunger.

In still another preferred aspect, the plunger has a slit in which the main valve element is adapted to be inserted in the horizontal direction so that the main valve element engages the plunger.

In further another preferred aspect, the variable-capacity compressor control valve further includes an urging member adapted to urge the sub valve element in a direction to close the valve.

Advantageous Effects of Invention

According to the present invention, the in-valve release passage for releasing a pressure Pc in the crank chamber to the suction chamber of the compressor via the Ps inlet/outlet port is provided in the valve body, and the sub valve element adapted to open or close the in-valve release passage along with movement of the plunger is provided. Therefore, the outside diameter of the main valve element can be reduced as compared to that of the conventional control valve with a configuration in which an in-valve release passage is provided in a main valve element, for example. Therefore, the control valve can be made compact, and the influence of the pressure difference between the crank chamber pressure Pc, the suction pressure Ps, and the like can be suppressed.

DESCRIPTION OF EMBODIMENTS

Hereinafter, embodiments of the present invention will be described with reference to the drawings.

Figure 1:
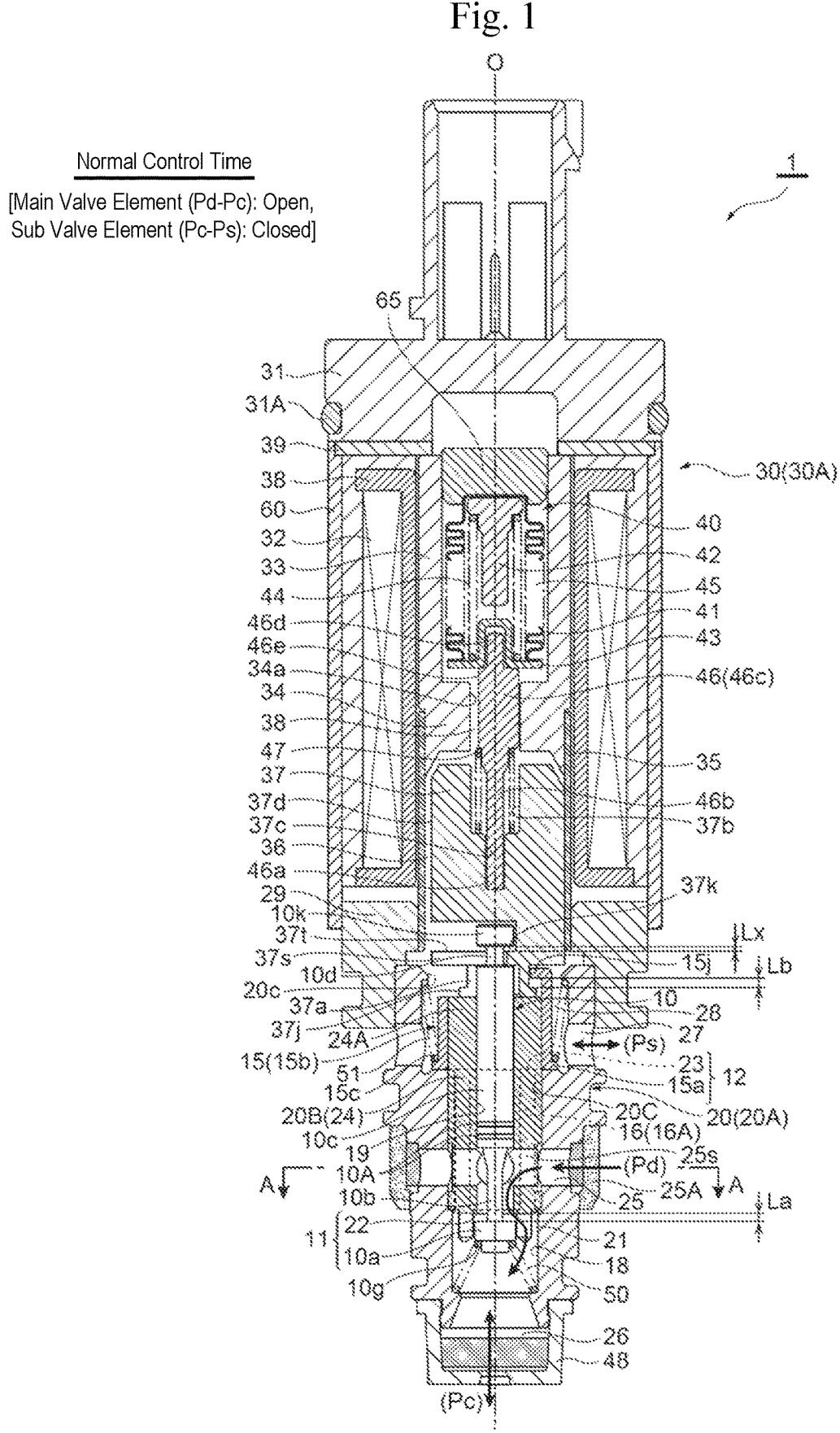
FIG. 1 is a longitudinal sectional view showing an embodiment of the variable-capacity compressor control valve in accordance with the present invention in which the main valve element is in the open position and the sub valve element is in the closed position (i.e., during the normal control time).
Figure 2:
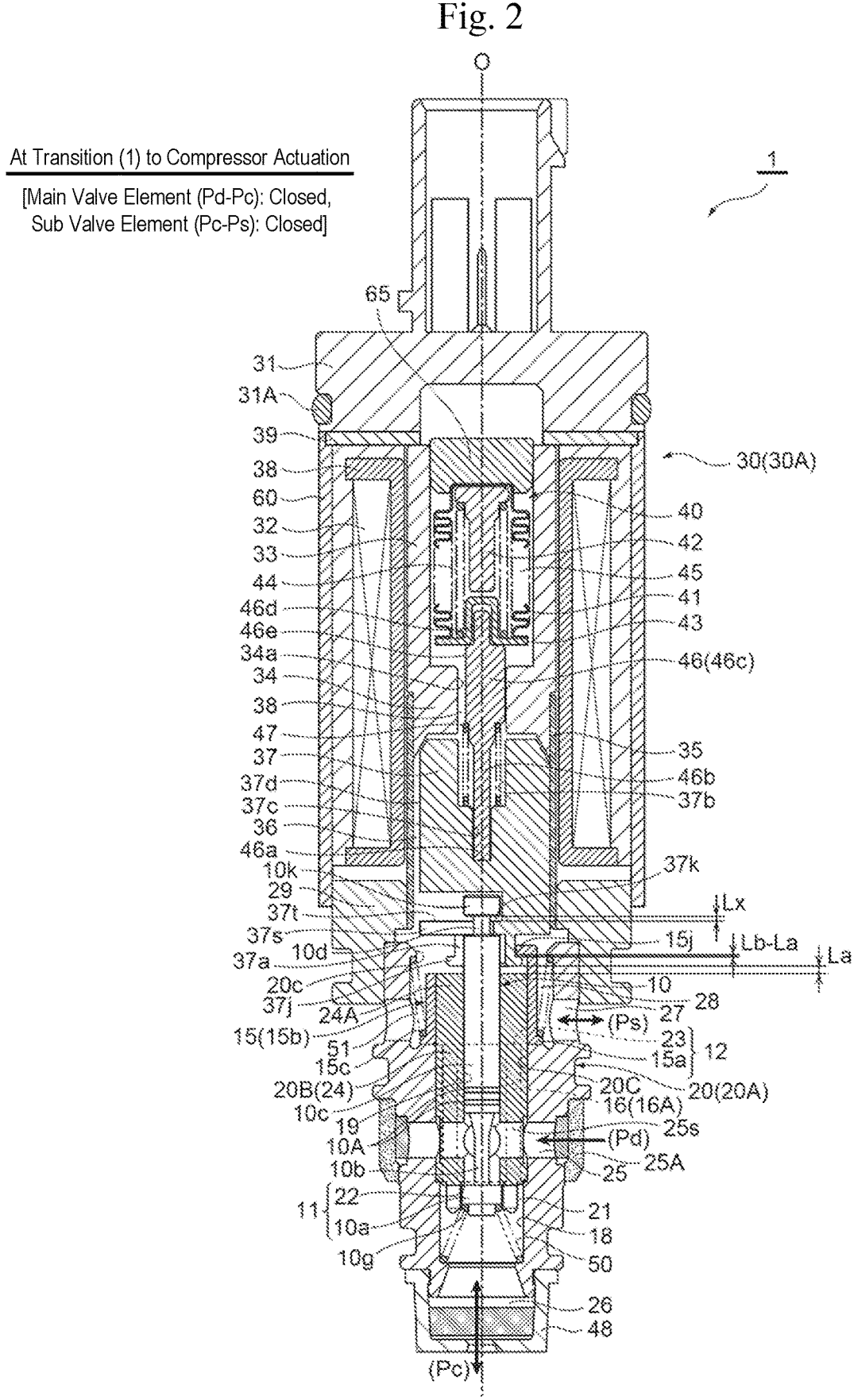
FIG. 2 is a longitudinal sectional view showing an embodiment of the variable-capacity compressor control valve in accordance with the present invention in which the main valve element is in the closed position and the sub valve element is in the closed position (i.e., at the time of transition (1) to compressor actuation).
Figure 3:
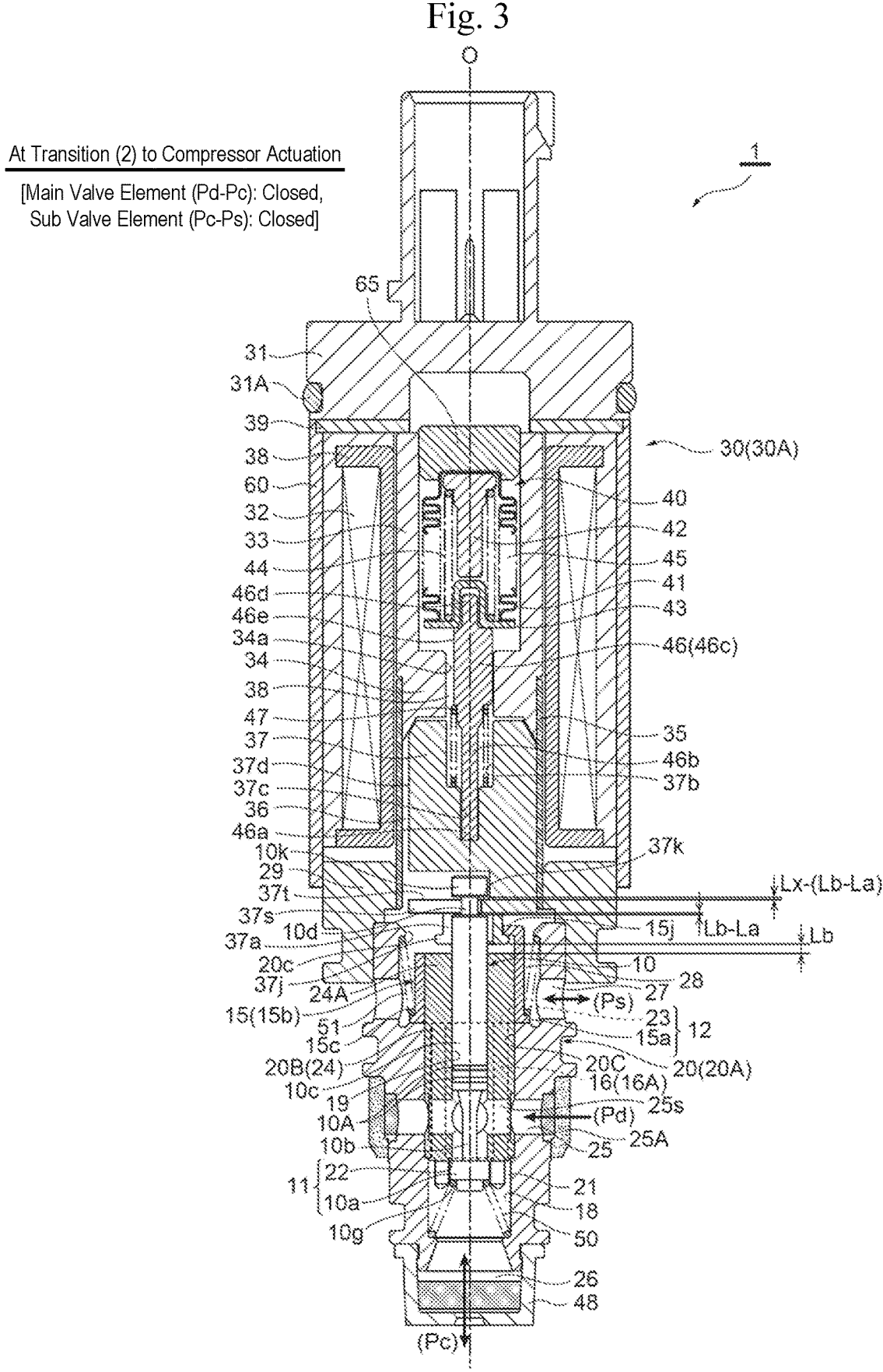
FIG. 3 is a longitudinal sectional view showing an embodiment of the variable-capacity compressor control valve in accordance with the present invention in which the main valve element is in the closed position and the sub valve element is in the closed position (i.e., at the time of transition (2) to compressor actuation).
Figure 4:
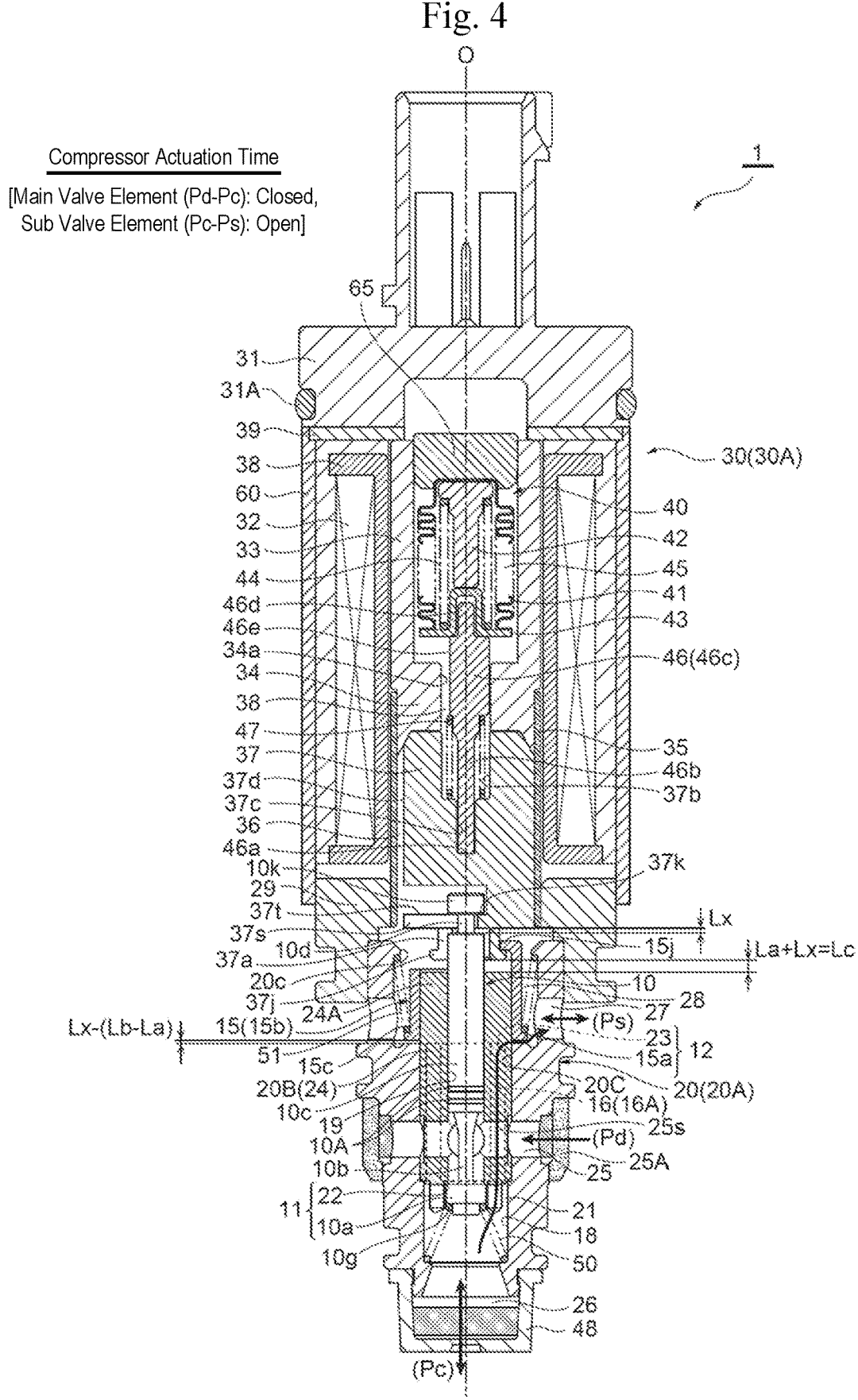
FIG. 4 is a longitudinal sectional view showing an embodiment of the variable-capacity compressor control valve in accordance with the present invention in which the main valve element is in the closed position and the sub valve element is in the open position (i.e., during the compressor actuation time).
Figure 5:
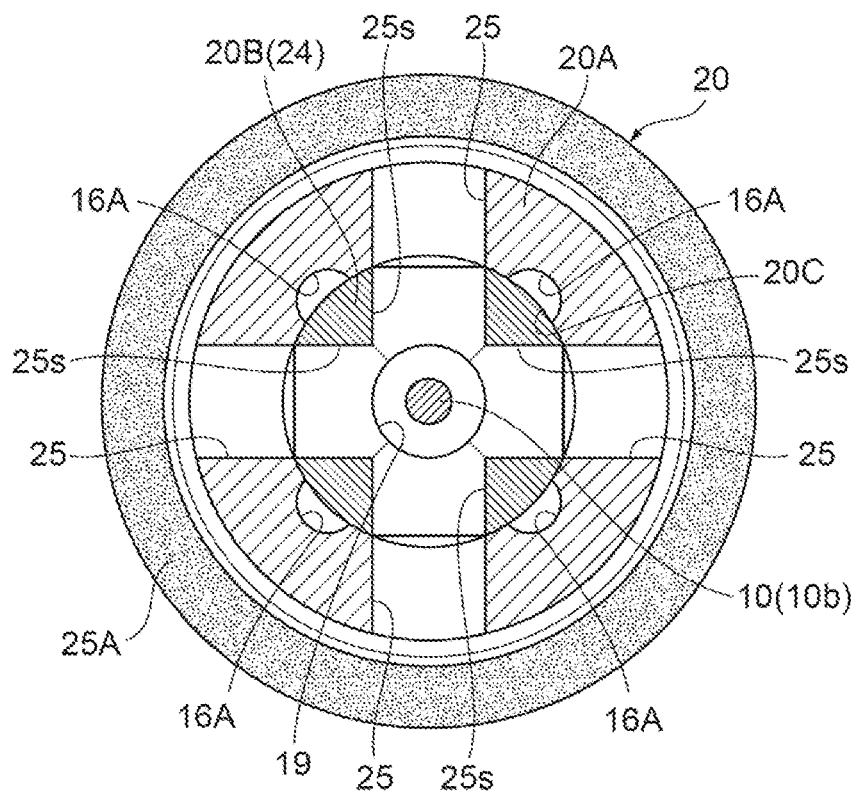
FIG. 5 is a sectional view in the direction of the arrow A-A in FIG. 1.
Figure 6:
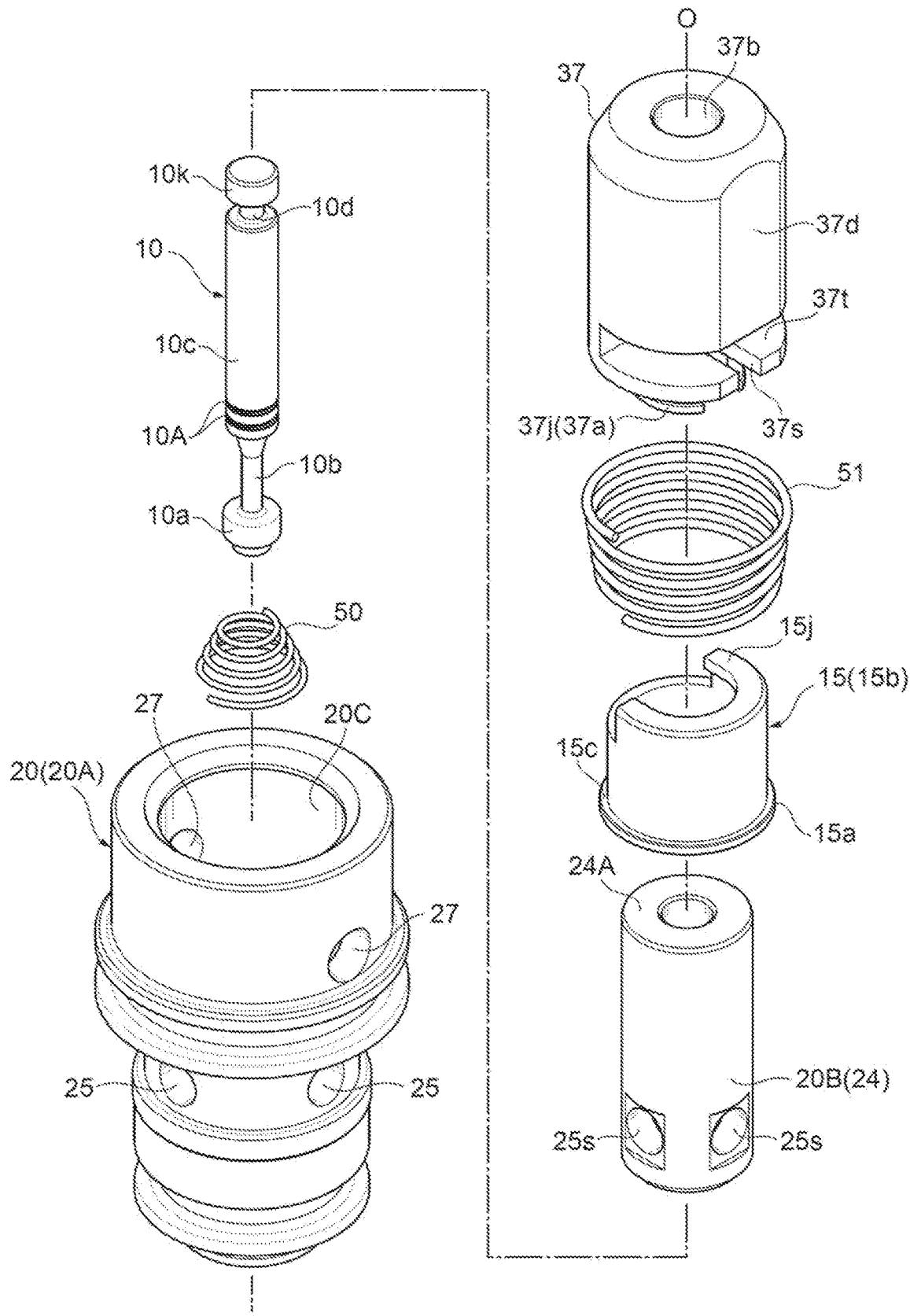
FIG. 6 is an exploded perspective view of the primary portion of the variable-capacity compressor control valve in accordance with the present invention.
Figure 7A:
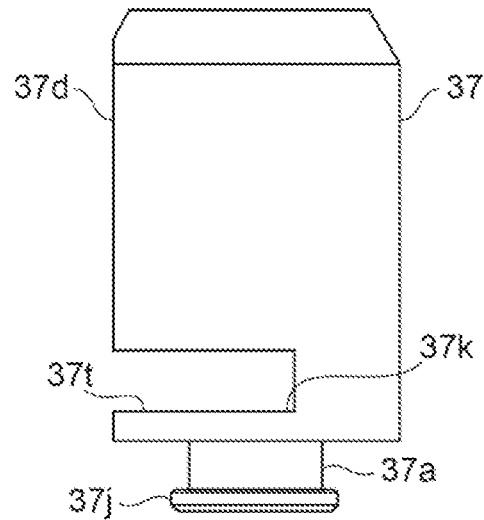
FIG. 7A is a front view of a plunger used for the variable-capacity compressor control valve in accordance with the present invention.
Figure 7B:
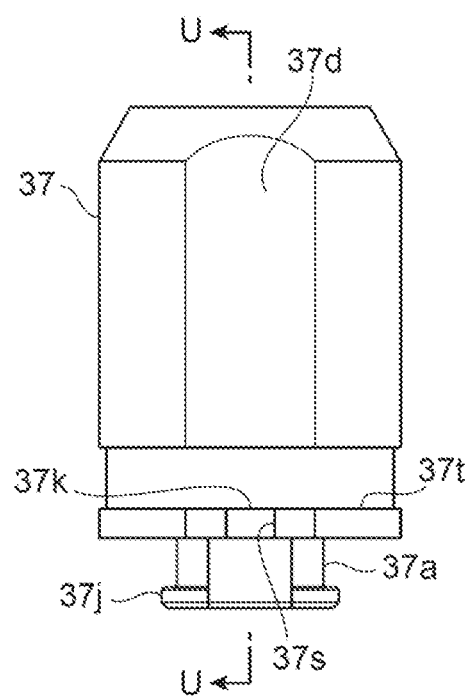
FIG. 7B is a left side view of the plunger used for the variable-capacity compressor control valve in accordance with the present invention.
Figure 7C:
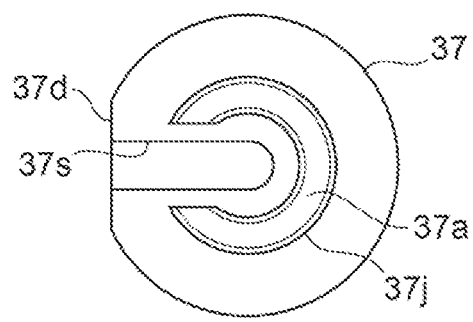
FIG. 7C is a bottom view of the plunger used for the variable-capacity compressor control valve in accordance with the present invention.
Figure 7D:
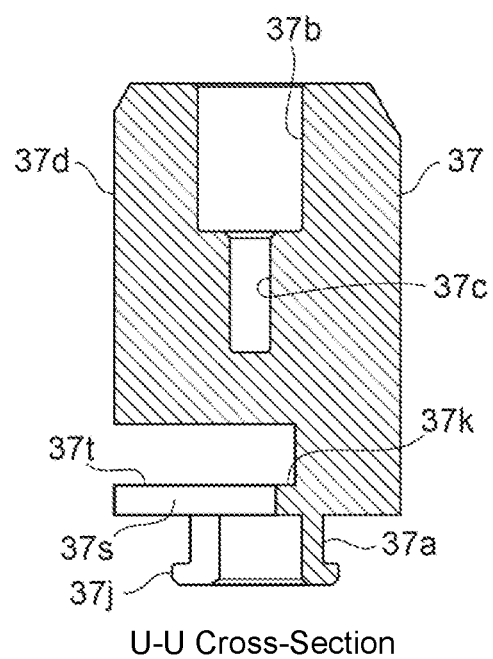
FIG. 7D is a sectional view of the plunger used for the variable-capacity compressor control valve in accordance with the present invention, in the direction of the arrow U-U in FIG. 7B.
Figure 8A:
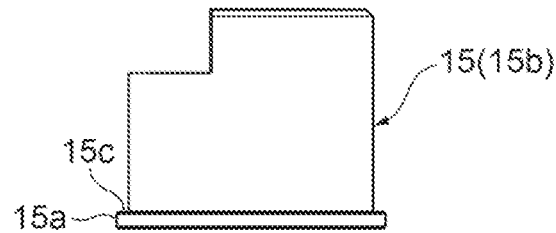
FIG. 8A is a front view of a sub valve element used for the variable-capacity compressor control valve in accordance with the present invention.
Figure 8B:
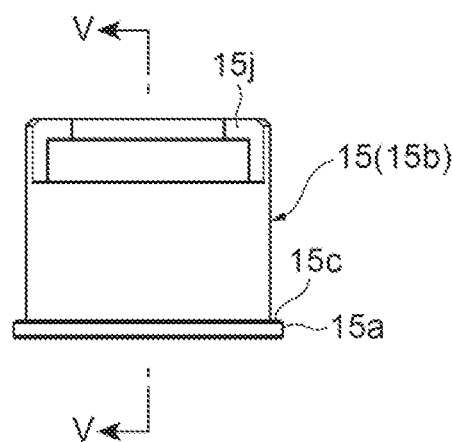
FIG. 8B is a left side view of the sub valve element used for the variable-capacity compressor control valve in accordance with the present invention.
Figure 8C:
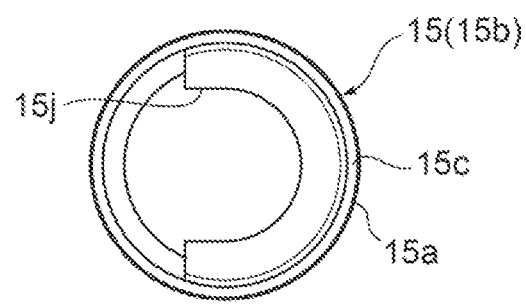
FIG. 8C is a top view of the sub valve element used for the variable-capacity compressor control valve in accordance with the present invention.
Figure 8D:
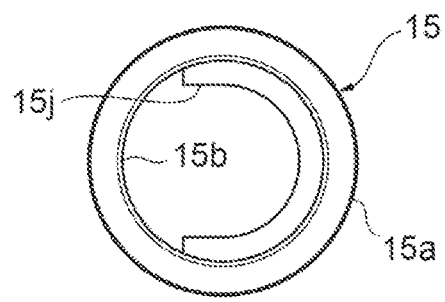
FIG. 8D is a bottom view of the sub valve element used for the variable-capacity compressor control valve in accordance with the present invention.
Figure 8E:
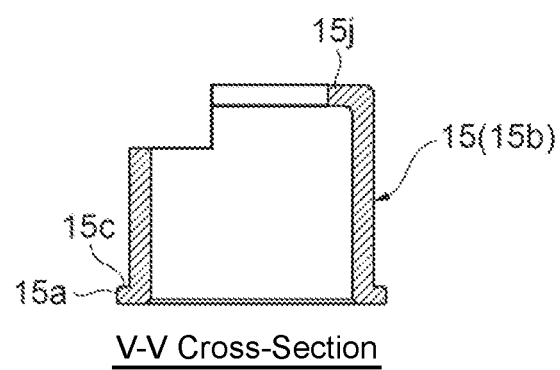
FIG. 8E is a sectional view of the sub valve element used for the variable-capacity compressor control valve in accordance with the present invention, in the direction of the arrow V-V in FIG. 8B.

FIGS. 1 to 4 are longitudinal sectional views each showing an embodiment of the variable-capacity compressor control valve in accordance with the present invention. Specifically, FIG. 1 shows a state in which the main valve element is in the open position and the sub valve element is in the closed position (i.e., during the normal control time), FIGS. 2 and 3 each show a state in which the main valve element is in the closed position and the sub valve element is in the closed position (i.e., at the time of transition to compressor actuation), and FIG. 4 shows a state in which the main valve element is in the closed position and the sub valve element is in the open position (i.e., during the compressor actuation time). FIG. 5 is a sectional view in the direction of the arrow A-A in FIG. 1, and FIG. 6 is an exploded perspective view of the primary portion of the variable-capacity compressor control valve in accordance with the present invention. It should be noted that FIG. 6 shows a state in which the plunger is rotated about the axis (i.e., the center line) by 180° from those in FIGS. 1 to 4.

It should be noted that in the present specification, descriptions indicating the positions or directions, such as upper, lower, top, bottom, left, right, front, and rear, are used for the sake of convenience in accordance with the drawings to avoid complexity in the description, but such descriptions do not necessarily indicate the actual positions or directions when the control valve of the present invention is incorporated into a compressor.

In addition, in each drawing, a gap formed between some members, a clearance between some members, and the like may be depicted larger or smaller than their actual dimensions to help understand the present invention and also for the sake of convenience to create the drawing.

A control valve 1 in the shown embodiment basically has a valve body 20 with a valve orifice 22; a main valve element 10 for opening or closing the valve orifice 22; an electromagnetic actuator 30 for moving the main valve element 10 in the direction to open or close the valve orifice (i.e., in the vertical direction); and a bellows device 40 as a pressure-sensitive reaction member.

The electromagnetic actuator 30 includes a bobbin 38, an energization coil 32 wound around the bobbin 38, a stator 33 and an attractor 34 arranged on the inner peripheral side of the coil 32, a guide pipe 35 whose upper end portion is joined by welding to the outer periphery of the lower end portion (i.e., a step portion) of the stator 33 and the attractor 34, a plunger 37 having a recessed cross section and arranged such that it is vertically slidable on the inner peripheral side of the guide pipe 35 below the attractor 34, a cylindrical housing 60 externally arranged around the coil 32, a connector head 31 attached to the upper side of the housing 60 with an attachment plate 39 interposed therebetween, and a holder 29 arranged between the lower end portion of the housing 60 and the lower end portion of the guide pipe 35 and adapted to fix them to the upper portion of the valve body 20. In this example, the attractor 34 with a cylindrical shape having an insertion through-hole 34a, which has a smaller diameter than the inside diameter of the stator 33, formed in the center (along the axis O) of the attractor 34 is integrally molded with the inner periphery of the lower portion of the cylindrical stator 33. In addition, an O-ring 31A, which is a sealing member, is attached to the outer periphery of the connector head 31 (or an annular attachment groove formed therein). Herein, a portion of the electromagnetic actuator 30 including the coil 32, the stator 33, the attractor 34, and the like and excluding the plunger 37 is referred to as a "solenoid portion 30A."

A stator 65 with a short columnar shape is securely attached to the upper portion of the stator 33 by press fitting or the like, and a pressure-sensitive chamber 45, which receives a suction pressure Ps in a compressor 100, is formed between the stator 65 and the attractor 34 on the inner peripheral side of the stator 33. The pressure-sensitive chamber 45 has arranged therein the bellows device 40 as the pressure-sensitive reaction member that includes bellows 41, a downwardly projecting upper stopper 42, a downwardly recessed lower stopper 43, and a compression coil spring 44. Further, a stepped, bar-like pushrod 46, which is a thrust transmitting member, is disposed along the axis O below the bellows device 40. The pushrod 46 includes an upper small-diameter portion 46d, an intermediate waist portion 46c, and a lower small-diameter portion 46b, which is relatively long in the direction of the axis O (i.e., in the vertical direction) in this order from the top side. The upper small-diameter portion 46d of the pushrod 46 is fitted and inserted in the recess of the lower stopper 43 and thus is supported therein, and the intermediate waist portion 46c of the pushrod 46 is slidably inserted in the insertion through-hole 34a of the attractor 34. The lower small-diameter portion 46b of the pushrod 46 is inserted in the recess hole 37b of the plunger 37 with a recessed cross section (herein, the recess hole that is vertically long and has approximately the same diameter as that of the insertion through-hole 34a of the attractor 34), and a lower end portion 46a of the pushrod 46 is fitted in a recessed fit-insertion hole 37 formed in the center of the bottom of the recess hole 37b.

A plunger spring (i.e., a valve-opening spring) 47, which is a cylindrical compression coil spring, is provided in a compressed state between a step portion (i.e., an annular terrace face facing downward) formed between the upper small-diameter portion 46d and the intermediate waist portion 46c of the pushrod 46, and the bottom of the recess hole 37b (i.e., a face thereof facing upward around the fit-insertion hole 37c) of the plunger 37 such that the plunger spring 47 is arranged around the lower small-diameter portion 46b of the pushrod 46. With the plunger spring 47 (or the compression force thereof), the plunger 37 is urged downward (i.e., in the direction to open the valve), and the bellows device 40 is held within the pressure-sensitive chamber 45 via the pushrod 46.

Further, as is clear from FIGS. 6 and 7A to 7D, a cut-in 37t with an approximately semicircular shape in plan view, which extends to a region around the center (on the axis O) of the plunger 37, is formed (in the horizontal direction) in the lower portion of the plunger 37 (i.e., in a portion above the lower end portion by a predetermined distance). In addition, a slit 37s, which extends linearly to the center from the lower end edge portion of the plunger 37, is formed below the cut-in 37t (that is, in a portion between the cut-in 37t and the lower end portion of the plunger 37). The height (in the vertical direction) of the cut-in 37t is set slightly larger than the height of a flanged latch portion 10k of the main valve element 10, and the height (in the vertical direction) of the slit 37s is set slightly smaller than the height of an upper small-diameter portion 10d of the main valve element 10 so that the main valve element 10 is vertically movable with respect to the plunger 37 (which will be described in detail later). In addition, the width (in the horizontal direction) of the slit 37s is set slightly larger than the outside diameter of the upper small-diameter portion 10d of the main valve element 10, taking into consideration the assembly property and the like, and smaller than the outside diameter of the flanged latch portion 10k of the main valve element 10. The outer peripheral portion (or a face thereof facing upward) of the slit 37s is an inner flanged latch portion 37k to which the flanged latch portion 10k of the main valve element 10 is adapted to be latched.

Further, a tubular leg portion 37a, which has an approximate C-shape in plan view, obtained by cutting away a portion corresponding to the slit 37s (specifically, cutting away a portion that is wider than the outside diameter of the intermediate fit-inserted portion 10c of the main valve element 10) is provided on the lower face of the plunger 37 in a (downwardly) protruding manner. The tubular leg portion 37a is arranged around the intermediate fit-inserted portion 10c (or the upper end portion thereof) of the main valve element 10 (with a slight clearance therebetween), and an outer flanged latch portion 37j, to which a flanged latch portion 15j of the sub valve element 15 described below is adapted to be latched, is provided on the lower end portion of the tubular leg portion 37a in a (outwardly) protruding manner.

In this example, a D-cut surface 37d is formed in a predetermined position on the outer periphery of the plunger 37 (in the example shown in the drawing, a portion where the cut-in 37t and the slit 37s are formed), and a gap 36 is formed between the outer periphery of the plunger 37 (or the D-cut surface 37d thereof) and the guide pipe 35. Similarly, a D-cut surface 46e is formed in a predetermined position on the outer periphery of the intermediate waist portion 46c of the pushrod 46, and a gap 38 is formed between the outer periphery of the pushrod 46 (or the D-cut surface 46e thereof) and the attractor 34. It should be noted that instead of the D-cut surface 37d of the plunger 37 or the D-cut surface 46e of the pushrod 46, one or more vertical grooves may be formed so that a gap(s) is/are formed between the outer periphery of the plunger 37 and the guide pipe 35 or between the outer periphery of the pushrod 46 and the attractor 34.

The main valve element 10 is made of metal, for example, and is formed of a stepped shaft-like solid member arranged along the axis O. The main valve element 10 includes, arranged sequentially from the bottom side, a main valve element portion 10a with relatively large-diameter, a lower small-diameter portion 10b, the intermediate fit-inserted portion 10c that is long in the vertical direction, the upper small-diameter portion 10d, and the flanged latch portion 10k. O-rings 10A are arranged as sealing members in two stages on the outer periphery of the lower portion of the intermediate fit-inserted portion 10c (or on annular grooves thereof arranged vertically in two stages).

As described above, the intermediate fit-inserted portion 10c (or the upper end portion thereof) of the main valve element 10 is inserted into the tubular leg portion 37a provided on the lower face of the plunger 37, and the upper small-diameter portion 10d is loosely fitted in the slit 37s, and further, the flanged latch portion 10k is loosely fitted in the cut-in 37t. The flanged latch portion 10k has a larger diameter than the width of the slit 37s so that when the plunger 37 is moved upward with respect to the main valve element 10, the inner flanged latch portion 37k made of the outer peripheral portion of the slit 37s is latched to the flanged latch portion 10k, and thus, latching is achieved and falling-out is prevented. In addition, the intermediate fit-inserted portion 10c also has a larger diameter than the width of the slit 37s so that the outer peripheral portion of the slit 37s on the lower face of the plunger 37 is opposite and in contact with a step portion between the intermediate fit-inserted portion 10c and the upper small-diameter portion 10d of the main valve element 10.

Meanwhile, the valve body 20 has a two-split structure that includes a stepped cylindrical body member 20A and a cylindrical seat member 20B, in which the stepped cylindrical body member 20A has a fit recess hole 20C in the center of the upper portion thereof and also has a housing hole 18, which has a slightly smaller diameter than that of the recess hole 20C and is continuous with the recess hole 20C, in the center of the lower portion thereof, and the cylindrical seat member 20B is securely inserted into the recess hole 20C by press fitting or the like.

The seat member 20B is produced from a material with relatively high hardness, such as stainless steel (SUS), and has a stopper portion (or a protruding portion) 24A for defining the lowest position of the plunger 37, provided in a protruding manner on the upper side of a fit-inserted portion 24 that is fitted and inserted in the recess hole 20C (in other words, such that the stopper portion 24A protrudes beyond the fit-inserted portion 24 toward the Ps inlet/outlet chamber 28). The lower end portion of the seat member 20B (or the fit-inserted portion 24 thereof) is made to abut a step portion (i.e., a terrace portion) between the recess hole 20C and the housing hole 18 of the body member 20A. In addition, a guide hole 19 in which the intermediate fit-inserted portion 10c of the main valve element 10 is adapted to be slidably fitted and inserted is formed in the center of the seat member 20B such that it penetrates through the center of the seat member 20B in the vertical direction (that is, along the axis O), and the lower end portion of the guide hole 19 is the valve orifice 22 (i.e., the valve seat portion) that is opened or closed by the main valve element portion 10a of the main valve element 10. Herein, the main valve element portion 10a and the valve orifice 22 form a main valve unit 11.

The (outside) diameter of the seat member 20B (and that of a tubular portion 15b of the sub valve element 15 described below) is smaller than that of the plunger 37.

The body member 20A is produced from a material, such as aluminum, brass, or resin, that has relatively low specific gravity (that is, a material with relatively low hardness) as compared to stainless steel and the like. A Ps inlet/outlet chamber 28 for the suction pressure Ps in the compressor 100 is formed around the outer periphery of the stopper portion 24A (in other words, on the upper end side of the seat member 20B of the body member 20A), and a plurality of (two in the example shown in the drawing) Ps inlet/outlet ports 27 are formed on the outer peripheral side of the Ps inlet/outlet chamber 28 in a state in which the seat member 20B (or the fit-inserted portion 24 thereof) is inserted in the recess hole 20C of the body member 20A. The suction pressure Ps introduced into the Ps inlet/outlet chamber 28 through the Ps inlet/outlet ports 27 is introduced into the pressure-sensitive chamber 45 via the slit 37s and the cut-in 37t formed on the bottom of the plunger 37, the gap 36 (in this example, a gap formed by the D-cut surface 37d) formed between the outer periphery of the plunger 37 and the guide pipe 35, the gap 38 (in this example, a gap formed by the D-cut surface 46e) formed between the outer periphery of the pushrod 46 and the attractor 34, and the like.

In addition, the housing hole 18, which has a larger diameter than those of the guide hole 19 and the main valve element portion 10a, for housing the main valve element portion 10a of the main valve element 10, is provided continuously with the center of the bottom of the recess hole 20C of the body member 20A. A valve-closing spring 50, which is a conical compression coil spring, is provided in a compressed state between the corner portion of the outer periphery of the bottom of the housing hole 18 and a step portion (i.e., a terrace portion) 10g provided on the outer periphery of the lower portion of the main valve element portion 10a of the main valve element 10. Thus, with the urging force of the valve-closing spring 50, the main valve element 10 (or a step portion between the intermediate fit-inserted portion 10c and the upper small-diameter portion 10d thereof) is pressed against the plunger 37 (or the lower face thereof). Herein, the inside of the housing hole 18 (i.e., a portion below the valve orifice 22 of the seat member 20B) is a valve chamber 21.

A plurality of Pd introduction ports 25 communicating with a discharge chamber 106 of the compressor 100 are provided in the recess hole 20C, and a ring-like filter member 25A is arranged around the outer periphery of the Pd introduction ports 25. In addition, a plurality of horizontal holes 25s communicating with the Pd introduction ports 25 and continuous with the guide hole 19 are provided in the fit-inserted portion 24 of the seat member 20B that is inserted in the recess hole 20C (in particular, in a portion below a portion of the fit-inserted portion 24 in which the intermediate fit-inserted portion 10c of the main valve element 10 is inserted). In the example shown in the drawing, four Pd introduction ports 25 and four horizontal holes 25s are provided at equiangular intervals (see, in particular, FIG. 5).

In addition, the lower end portion of the body member 20A has a lid-like member 48, which functions as a filter, fixed thereto by engagement, press fitting, or the like. A Pc inlet/outlet chamber (or an inlet/outlet port) 26, which communicates with a crank chamber 104 of the compressor 100, is provided above the lid-like member 48 and below the housing hole 18 (in other words, on the lower end side of the seat member 20B of the body member 20A). The Pc inlet/outlet chamber (or the inlet/outlet port) 26 communicates with the Pd introduction ports 25 via the valve chamber 21→the gap between the valve orifice 22 and the main valve element portion 10*a*→the gap between the lower portion of the guide hole 19 and the lower small-diameter portion 10*b*→the horizontal holes 25*s* of the fit-inserted portion 24.

Further, in this embodiment, a communication passage 16A in the valve body, which allows the Pc inlet/outlet chamber 26 and the Ps inlet/outlet chamber 28 to communicate with each other, is provided between the body member 20A and the seat member 20B of the valve body 20.

Specifically, as is clear from FIG. 5, a plurality of vertical grooves, which are approximately semicircular in shape in plan view, and open to the valve chamber 21 (and the Pc inlet/outlet chamber 26) at their lower ends, and also open to the Ps inlet/outlet chamber 28 at their upper ends, are formed (in the circumferential direction) on the inner periphery of the body member 20A of the valve body 20, more specifically, on the peripheral wall of the recess hole 20C, in which the fit-inserted portion 24 of the seat member 20B is inserted, and the upper end portion of the housing hole 18 continuous with the recess hole 20C. The plurality of vertical grooves (which extend in the vertical direction) form the communication passage 16A in the valve body that allows the Pc inlet/outlet chamber 26 and the Ps inlet/outlet chamber 28 to communicate with each other. In the example shown in the drawing, four vertical grooves (i.e., the communication passage 16A in the valve body) are provided at equiangular intervals such that each vertical groove is located at an intermediate position between the adjacent Pd introduction ports 25. Such communication passage 16A in the valve body partially forms the in-valve release passage 16, and the upper end portion of the communication passage 16A in the valve body is a sub valve seat portion 23 with/from which the lower end portion (i.e., a sub valve element portion) 15*a* of the sub valve element 15 is adapted to be moved into contact or away (which will be described in detail later).

Meanwhile, the sub valve element 15 for opening or closing the in-valve release passage 16 (i.e., the communication passage 16A in the valve body) is vertically slidably disposed on the outer periphery of the stopper portion 24A, which protrudes toward the Ps inlet/outlet chamber 28, of the seat member 20B.

The sub valve element 15 is made of metal, for example, and has a tubular portion 15*b* that has approximately the same diameter as that (i.e., the outside diameter) of the stopper portion 24A and is adapted to be slidably disposed around the stopper portion 24A. The lower end portion of the tubular portion 15*b* is the sub valve element portion 15*a* that is adapted to be moved into contact with or away from the sub valve seat portion 23, which is the upper end edge portion of the communication passage 16A in the valve body, and thus is adapted to open or close the in-valve release passage 16. Herein, the sub valve seat portion 23 and the sub valve element portion 15*a* form a sub valve unit 12.

In addition, a flanged lower spring seat portion 15*c* is provided in an (outwardly) protruding manner on the lower end portion of the tubular portion 15*a*, and a flanged upper spring seat portion 20*c* is provided in a protruding manner on the upper end portion (i.e., on the inner periphery) of the valve body 20 (or the body member 20A thereof). In addition, a valve-closing spring (i.e., an urging member) 51, which is a compression coil spring in an inverted conical shape adapted to urge the sub valve element 15 downward (i.e., in the valve closing direction in which the in-valve release passage 16 (i.e., the communication passage 16A in the valve body) is closed), is provided in a compressed state between the lower spring seat portion 15*c* and the upper spring seat portion 20*c*.

The upper end of the sub valve element 15 (or the tubular portion 15*b* thereof) is located above the stopper portion 24A (or the upper end thereof) by a predetermined distance, and as is clear from FIGS. 6 and 8A to 8E, the flanged latch portion 15*j* for moving the sub valve element 15 in conjunction with the plunger 37 is provided in an inwardly protruding manner in an upper end opening (i.e., an upper end portion on the side opposite to the sub valve element portion 15*a*) of the sub valve element 15 (or the tubular portion 15*b* thereof). Herein, the flanged latch portion 15*j* is provided in a portion around over half the circumference of the upper end opening. The flanged latch portion 15*j* protrudes from the upper end opening of the tubular portion 15*b* toward the tubular leg portion 37*a* of the plunger 37 that is arranged around the intermediate fit-inserted portion 10*c* of the main valve element 10. When the plunger 37 is moved upward with respect to the sub valve element 15, the flanged latch portion 15*j* is adapted to be latched to the outer flanged latch portion 37*j* of the plunger 37 (or the tubular leg portion 37*a* thereof).

In this embodiment, as described above, the Pc inlet/outlet chamber 26, the valve chamber 21, the communication passage 16A provided in the valve body 20, the Ps inlet/outlet chamber 28, and the like form the in-valve release passage 16 for releasing the pressure Pc in the crank chamber 104 to the suction chamber 107 of the compressor 100 via the Ps inlet/outlet ports 27, and the sub valve element portion (or the lower end portion) 15*a* of the sub valve element 15 moves into contact with or away from the sub valve seat portion 23 that is the upper end edge portion of the communication passage 16A in the valve body, so that the in-valve release passage 16 is opened or closed.

In order to attach the main valve element 10, the sub valve element 15, and the plunger 37 together, for example, the main valve element 10 may be attached (from the lower side) into the guide hole 19 of the valve body 20 in advance, and the sub valve element 15 may be attached (from the upper side) to the stopper portion 24A, and then, the plunger 37 may be moved horizontally with respect to the main valve element 10 and the sub valve element 15 such that the flanged latch portion 10*k* and the upper small-diameter portion 10*d* of the main valve element 10 are inserted into the cut-in 37*t* and the slit 37*s* of the plunger 37, respectively, and further, the intermediate fit-inserted portion 10*c* of the main valve element 10 is arranged on the inner side of the tubular leg portion 37*a* from an open portion of the tubular leg portion 37*a*, which is in an approximate C-shape in plan view, and then, the tubular leg portion 37*a* is arranged on the upper end of the tubular portion 15*b* and on the inner side of the flanged latch portion 15*j* of the sub valve element 15 via the open portion (where the flanged latch portion 15*j* is not provided) of the upper end of the sub valve element 15, and thus, the flanged latch portion 10*k* and the upper small-diameter portion 10*d* of the main valve element 10 may be fitted and inserted deep inside the cut-in 37*t* and the slit 37*s* of the plunger 37 (that is, along the central axis O of the plunger 37). It should be noted that the drawings other than FIG. 6 show a state in which the plunger 37 has been moved horizontally with respect to the main valve element 10 and the sub valve element 15, and then rotated about the axis O by approximately 180° so as to allow the outer flanged latch portion 37*j* of the plunger 37 to surely engage the flanged latch portion 15*j* of the sub valve element 15.

Herein, in the control valve 1 of this embodiment, as shown in FIG. 1, when the plunger 37, the main valve element 10, and the sub valve element 15 are at the lowest position (i.e., when the bottom end face of the plunger 37 (i.e., the lower end face of the outer flanged latch portion 37j of the tubular leg portion 37a of the plunger 37) abuts the stopper portion 24A (or the upper face thereof), and the main valve unit 11 is in the fully open position, while the sub valve unit 12 is in the fully closed position), a clearance in the vertical direction between the main valve element portion 10a of the main valve element 10 and the valve orifice 22 (i.e., the valve seat portion) is represented by a first lift amount La, a clearance between the outer flanged latch portion 37j of the plunger 37 and the flanged latch portion 15j of the sub valve element 15 is represented by a second lift amount Lb (>La), a clearance between the inner flanged latch portion 37k of the plunger 37 and the flanged latch portion 10k of the main valve element 10 is represented by a predetermined amount Lx. Then, the maximum lift amount (i.e., a third lift amount) of the plunger 37: Lc (>Lb) (i.e., the lift amount from the lowest position to the highest position of the plunger 37) is the first lift amount La+the predetermined amount Lx. That is, each clearance is set so that the relationship Lx>Lb−La is satisfied.

Next, the operation of the control valve 1 with the aforementioned configuration will be described.

During the normal control time (i.e., Pd→Pc control time), the lift amount of the plunger 37 is slightly greater than the first lift amount La at the maximum, and during the compressor actuation time (i.e., Pc→Ps control time), the lift amount of the plunger 37 is the third lift amount Lc.

Figure 9:
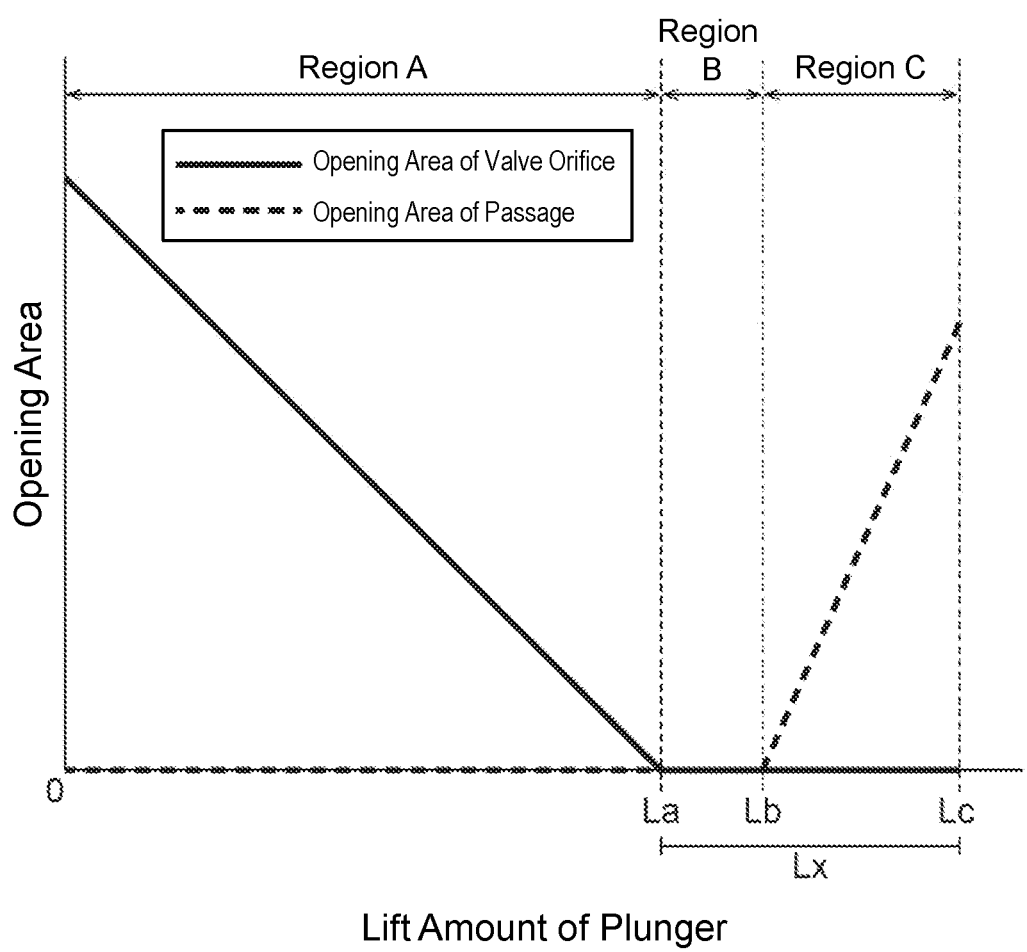
FIG. 9 is a view showing the relationship between the lift amount of the plunger and the opening area of the valve orifice and the opening area of the in-valve release passage in the variable-capacity compressor control valve in accordance with the present invention.
Figure 10A:
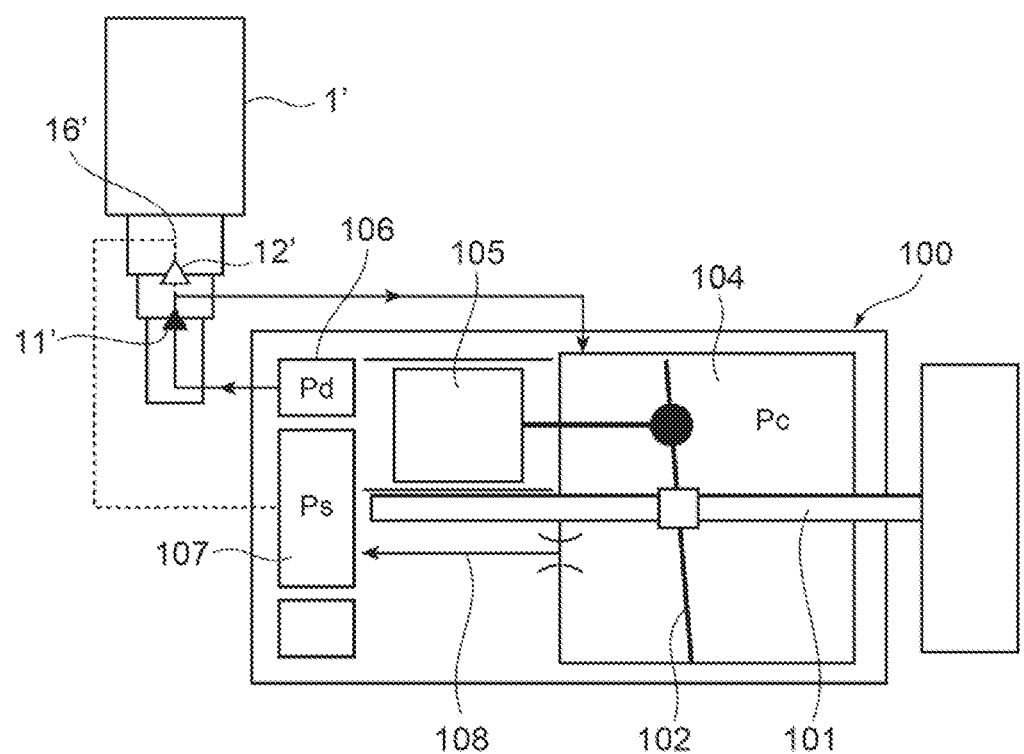
FIG. 10A is a view showing the circulation state of a refrigerant pressure between a compressor and a control valve of the conventional art, and showing the normal control time.
Figure 10B:
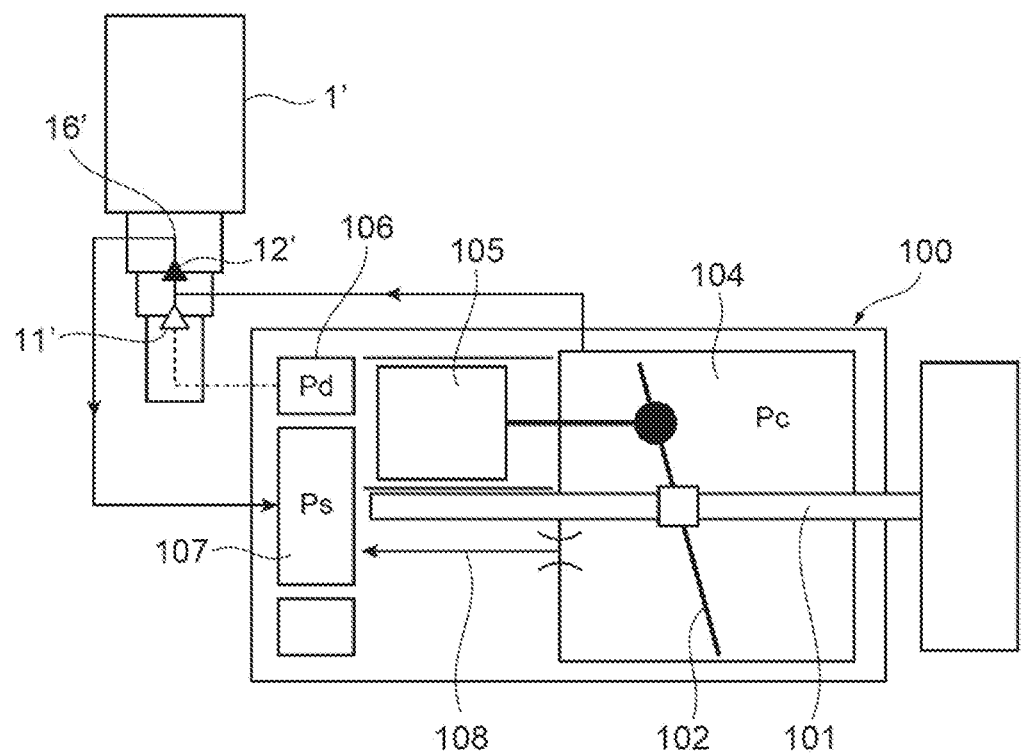
FIG. 10B is a view showing the circulation state of a refrigerant pressure between a compressor and a control valve of the conventional art, and showing the compressor actuation time.

That is, during the normal control time (i.e., Pd→Pc control time), when the solenoid portion 30A including the coil 32, the stator 33, the attractor 34, and the like is supplied with current and thus is energized, the plunger 37 is attracted by the attractor 34, and following the movement of the plunger 37, the main valve element 10 is moved upward (i.e., in the direction to close the valve) by the urging force of the valve-closing spring 50. Meanwhile, the suction pressure Ps introduced from the compressor 100 through the Ps inlet/outlet ports 27 is introduced into the pressure-sensitive chamber 45 through the Ps inlet/outlet chamber 28 via the slit 37s and the cut-in 37t of the plunger 37, and the bellows device 40 (i.e., the inside thereof is at a vacuum pressure) is expansively or contractively displaced in accordance with the pressure (i.e., the suction pressure Ps) in the pressure-sensitive chamber 45 (i.e., contracts if the suction pressure Ps is high, and expands if it is low), and the displacement is then transmitted to the main valve element 10 via the pushrod 46 and the plunger 37, whereby the valve opening (i.e., the clearance between the valve orifice 22 and the main valve element portion 10a) is regulated, and the pressure Pc in the crank chamber 104 is controlled in accordance with the valve opening. Along with this, the inclination angle of the swash plate 102 and the stroke of the piston 105 in the compressor 100 are controlled so as to increase or decrease the discharge capacity (see a region A shown in FIG. 9).

In this case, the main valve element 10 is always urged upward by the urging force of the valve-closing spring 50, while the sub valve element 15 is always urged downward by the urging force of the valve-closing spring 51 as the flanged latch portion 15j of the sub valve element 15 is not latched to the outer flanged latch portion 37j of the plunger 37 (as Lb>La). Therefore, the sub valve element portion 15a is in a state of being pressed against the sub valve seat portion 23 (i.e., the sub valve unit 12 is closed), and the in-valve release passage 16 is blocked in the valve body 20. Therefore, there is no possibility that the crank chamber pressure Pc may be released to the suction chamber 107 via the in-valve release passage 16.

In contrast, during the compressor actuation time, the solenoid portion 30A is supplied with current and thus is energized, and the plunger 37 is attracted by the attractor 34. Following the upward movement of the plunger 37, the main valve element 10 is also moved upward, and the valve orifice 22 is closed by the main valve element portion 10a of the main valve element 10. Then, the plunger 37 is moved further upward, whereby the sub valve element 15 opens the in-valve release passage 16, and thus, the pressure Pc in the crank chamber 104 is released into the suction chamber 107 via two passages that are an in-compressor release passage 108 and the in-valve release passage 16.

Specifically, until the upward movement amount of the plunger 37 reaches the first lift amount La, the main valve element 10 is moved in the direction to close the valve by the urging force of the valve-closing spring 50 such that it follows the upward movement of the plunger 37. Then, when the upward movement amount reaches the first lift amount La, the valve orifice 22 is closed by the main valve element portion 10a of the main valve element 10 (i.e., the state shown in FIG. 2). During the compressor actuation time, the plunger 37 is moved further upward with the main valve unit 11 in the closed valve state (i.e., with the main valve element 10 still in the closed valve state). The sub valve element 15 remains still in the closed valve state due to the urging force of the valve-closing spring 51 (with the sub valve element portion 15a pressed against the sub valve seat portion 23) (i.e., a region B shown in FIG. 9) until the upward movement amount of the plunger 37 reaches the second lift amount Lb. When the upward movement amount reaches the second lift amount Lb, the outer flanged latch portion 37j of the plunger 37 is latched to the flanged latch portion 15j of the sub valve element 15 (i.e., the state shown in FIG. 3). Then, in such a state, the plunger 37 is moved further upward (i.e., the state shown in FIG. 4) (i.e., a region C shown in FIG. 9) until the inner flanged latch portion 37k of the plunger 37 is latched to the flanged latch portion 10k of the main valve element 10, that is, by an amount corresponding to Lx-(Lb-La). In other words, after the upward movement amount of the plunger 37 reaches the first lift amount La, the sub valve element 15 is lifted (from the valve body 20) by an amount corresponding to Lx-(Lb-La) until the inner flanged latch portion 37k of the plunger 37 is latched to the flanged latch portion 10k of the main valve element 10. In such a case, the main valve element 10 remains still in the closed valve state, while the sub valve element portion 15a of the sub valve element 15 is lifted from the sub valve seat portion 23 by the amount corresponding to Lx-(Lb-La), whereby the in-valve release passage 16 is opened. Once the inner flanged latch portion 37k of the plunger 37 is latched to the flanged latch portion 10k of the main valve element 10, neither the plunger 37 nor the sub valve element 15 is lifted any further even when the solenoid portion 30A generates an attraction force.

As described above, in the control valve 1 of this embodiment, the pressure Pc in the crank chamber 104 is released to the suction chamber 107 via two passages that are the in-compressor release passage 108 and the in-valve release passage 16 during the compressor actuation time. Therefore, the time required to increase the discharge capacity during the compressor actuation time can be significantly reduced. Further, during the normal control time (i.e., Pd→Pc control time), the in-valve release passage 16 is closed by the sub valve element 15. Therefore, there is no possibility that the operational efficiency of the compressor 100 will decrease.

In addition, since the in-valve release passage 16 for releasing the pressure Pc in the crank chamber 104 to the suction chamber 104 of the compressor 100 via the Ps inlet/outlet ports 27 is provided in the valve body 20, and the sub valve element 15 for opening or closing the in-valve release passage 16 along with the movement of the plunger 37 is provided, it is possible to reduce the outside diameter of the main valve element 10 in comparison with the conventional control valve in which the in-valve release passage is provided in the main valve element, for example. Therefore, the size of the control valve 1 can be reduced, and the influence of the pressure difference between the crank chamber pressure Pc, the suction pressure Ps, and the like can be suppressed.

In the aforementioned embodiment, the vertical grooves formed on the inner periphery of the body member 20A of the valve body 20 form the communication passage 16A in the valve body that partially forms the in-valve release passage 16. However, for example, the vertical grooves (i.e., the communication passage 16A in the valve body) may be provided on the outer periphery of the seat member 20B or each of the body member 20A and the seat member 20B. In addition, for example, the valve body 20 may be formed using a single component (i.e., not two components including the body member 20A and the seat member 20B), and a communication passage in the valve body, including a through-hole and the like, may be formed in the valve body.

It is needless to mention that the arrangement position and the shape of the sub valve element 15 that opens or closes the in-valve release passage 16, a mechanism for connection to the plunger 37, and the like can be changed as appropriate.

REFERENCE SIGNS LIST

1 Variable-capacity compressor control valve
10 Main valve element
10a Main valve element portion
10b Lower small-diameter portion
10c Intermediate fit-inserted portion
10d Upper small-diameter portion
10k Flanged latch portion
11 Main valve unit
12 Sub valve unit
15 Sub valve element
15a Sub valve element portion
15b Tubular portion
15j Flanged latch portion
16 In-valve release passage
16A Communication passage in the valve body
18 Housing hole
19 Guide hole
20 Valve body
20A Body member
20B Seat member
20C Recess hole
21 Valve chamber
22 Valve orifice
23 Sub valve seat portion
24 Fit-inserted portion
24A Stopper portion (protrusion)
25 Pd introduction port
25s Horizontal hole
26 Pc inlet/outlet chamber (inlet/outlet port)
27 Ps inlet/outlet port
28 Ps inlet/outlet chamber
30 Electromagnetic actuator
30A Solenoid portion
32 Coil
33 Stator
34 Attractor
37 Plunger
37a Tubular leg portion
37j Outer flanged latch portion
37k Inner flanged latch portion
37s Slit
37t Cut-in
40 Bellows device (pressure-sensitive reaction member)
45 Pressure-sensitive chamber
46 Pushrod
50 Valve-closing spring
51 Valve-closing spring (urging member)

The invention claimed is:

1. A variable-capacity compressor control valve comprising:
a valve body including a valve chamber with a valve orifice, a Ps inlet/outlet port communicating with a suction chamber of a compressor, a Pd introduction port arranged upstream of the valve orifice and communicating with a discharge chamber of the compressor, and a Pc inlet/outlet port arranged downstream of the valve orifice and communicating with a crank chamber of the compressor;
a main valve element adapted to open or close the valve orifice;
an electromagnetic actuator including a plunger, the electromagnetic actuator being adapted to move the main valve element in a direction to open or close the valve orifice;
a pressure-sensitive chamber adapted to receive a suction pressure Ps from the compressor via the Ps inlet/outlet port; and
a pressure-sensitive reaction member adapted to urge the main valve element in the direction to open or close the valve orifice in accordance with a pressure in the pressure-sensitive chamber,
wherein:
the valve body includes an in-valve release passage for releasing a pressure Pc in the crank chamber to the suction chamber of the compressor via the Ps inlet/outlet port,
a sub valve element adapted to open or close the in-valve release passage along with a movement of the plunger is provided, and
when the plunger is continuously moved upward from a lowest position by an attraction force of the electromagnetic actuator, the main valve element is moved upward together with the plunger while the sub valve element closes the in-valve release passage, and when the plunger is moved further upward after the valve orifice is closed by the main valve element, the sub valve element is moved upward together with the plunger while the main valve element closes the valve orifice so that the in-valve release passage is opened,
wherein the in-valve release passage includes a communication passage in the valve body, the communication passage being adapted to allow a Pc inlet/outlet chamber continuous with the Pc inlet/outlet port and a Ps inlet/outlet chamber continuous with the Ps inlet/outlet port in the valve body to communicate with each other,
wherein the valve body includes a tubular body member and a seat member securely inserted in the body member, the Pc inlet/outlet chamber is formed in the body member on one end side of the seat member, the Ps inlet/outlet chamber is formed in the body member on another end side of the seat member, and the communication passage in the valve body is arranged between the body member and the seat member, and wherein the communication passage in the valve body includes a vertical groove formed on one of an inner periphery of the body member or an outer periphery of the seat member.

2. The variable capacity compressor control valve according to claim 1, further comprising an urging member adapted to urge the sub valve element in a direction to close the valve.

3. The variable-capacity compressor control valve according to claim 1, wherein the sub valve element is movably disposed in the Ps inlet/outlet chamber.

4. The variable-capacity compressor control valve according to claim 3, wherein:

the seat member has a protrusion that protrudes toward the Ps inlet/outlet chamber, and the sub valve element is slidably disposed on an outer periphery of the protrusion.

5. The variable-capacity compressor control valve according to claim 4, wherein:

the sub valve element includes a tubular portion and a flanged latch portion, the tubular portion being adapted to be slidablyl disposed around the protrusion and moved into contact with or away from an end edge portion of the communication passage in the valve body, and the flanged latch portion being adapted to be latched to the plunger so as to be moved together with the plunger.

6. The variable-capacity compressor control valve according to claim 5, wherein the flanged latch portion is provided at one end of the tubular portion on a side opposite to another end that is adapted to be moved into contact with or away from the end edge portion of the communication passage in the valve body.

7. The variable-capacity compressor control valve according to claim 6, wherein the flanged latch portion is provided inwardly at the one end of the tubular portion.

8. The variable-capacity compressor control valve according to claim 5, wherein the protrusion is a stopper portion adapted to define the lowest position of the plunger.

9. The variable-capacity compressor control valve according to claim 8, wherein the plunger includes an outer flanged latch portion adapted to be opposite and in contact with the stopper portion and adapted to allow the flanged latch portion of the sub valve element to be latched thereto.

10. The variable-capacity compressor control valve according to claim 9, wherein the flanged latch portion of the sub valve element and the outer flanged latch portion of the plunger are adapted to engage each other when the sub valve element is moved horizontally with respect to the plunger.

11. The variable-capacity compressor control valve according to claim 10, wherein the plunger has a slit in which the main valve element is adapted to be inserted in the horizontal direction so that the main valve element engages the plunger.

* * * * *